Dec. 9, 1947. W. V. COOK 2,432,090
RECORDING METER PEN
ed Nov. 1, 1943
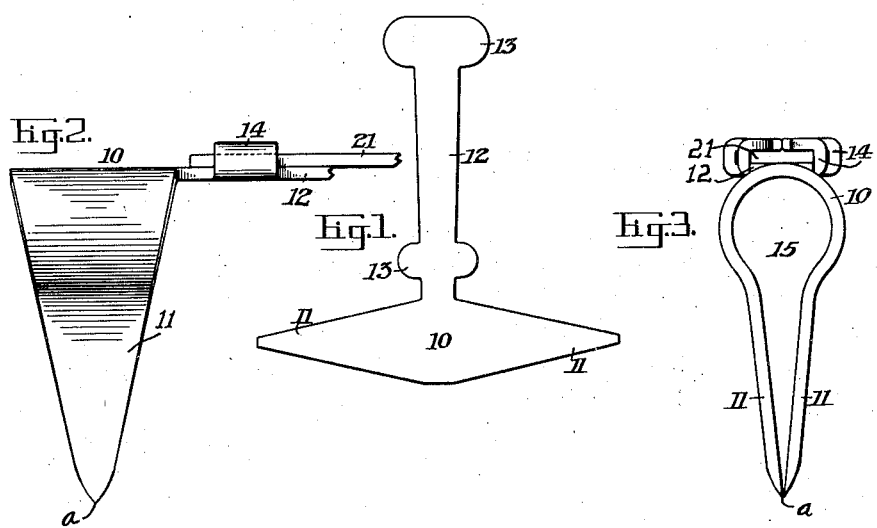
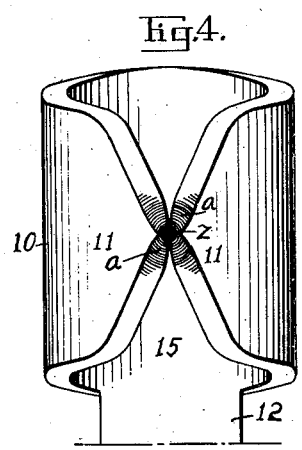
Walter V. Cook,
Inventor Patented Dec. 9, 1947

2,432,090

UNITED STATES PATENT OFFICE 2,432,090

RECORDING METER PEN

Walter V. Cook, Collingswood, N. J., assignor to The Esterbrook Pen Company, Camden, N. J., a corporation of New Jersey Application November 1, 1943, Serial No. 508,619

12 Claims. (Cl. 120—43)

My invention relates to metal pens or marking implements designed to effect a line, delineation, or other mark when supplied with writing fluid—ink or the like—which, in the form of pen to which my invention relates, is self-contained; the body of the pen functioning as a fountain and supplying the nib portion thereof with the marking fluid contained therein.

More particularly my invention relates to certain improvements in one form of that type of pen more familiarly known as a recording meter pen.

Pens of this type are usually supported by an arm that is moved under the control of various factors, including time; temperature, velocity of the wind; the motion of the object carrying the same, etc., the record of such movements of the actuating arm being applied by the pen to a moving chart or record sheet that may be in the form of a disk, a continuously moving sheet horizontally or vertically disposed, and/or other forms of record surfaces.

In many of these metering devices, the arm or other instrumentality carrying the pen may be arranged to rise or otherwise move independently of its record functioning and lift the pen from the surface upon which the record is being made and then cause the pen to engage the same; such reengagement being at a point behind that at which the pen was lifted due to the continuing movement of the record sheet.

In providing a pen for the described purpose it is an essential that it shall begin to effect a mark instantly and continue to mark as long as it is in engagement with the surface to be marked and at the same time carries a supply of marking fluid.

In its essential character my present invention relates to the nib point or surface-contacting end of the pen.

In the structure of my invention the nib end of the pen is rounded and/or tapered in such way as to terminate the space between the nibs—wherein the writing or marking fluid is present—at the exact end portion of the pen; insuring application of such marking fluid the instant the pen contacts with the record surface.

A particular feature or object of my invention is to provide a recording meter pen whose marking end is of such shape or contour that lines produced thereby shall be of the same character as to width no matter what the position of the pen may be when marking or in what direction the pen may be moving relatively to the record sheet.

These and other features of my invention are more fully set forth hereinafter; reference being had to the accompanying drawings, more or less diagrammatic in character, in which:

Figure 1 is an enlarged view of a blank from which a pen of the type to which my invention relates may be made.

Fig. 2 is a side elevation, on a larger scale, of my improved pen structure made from a blank such as shown in Fig. 1.

Fig. 3 is a front elevation or end view of the pen shown in Fig. 2.

Fig. 4 is an inverted plan view of the finished pen showing the rounded surface-contacting end of the nibs.

The minute size of my improved recording meter pen is such that it is necessary to present greatly enlarged views of the same on the accompany sheet of drawings in order that the features constituting my invention may be properly shown.

In Fig. 1, therefore, which represents a blank from which a pen of this type may be made, the size of such blank has been considerably enlarged and such enlargement, or greater, is carried out in other views of the drawing.

Referring to Fig. 1, it will be seen as representing a substantially central body portion 10, which terminates in relatively pointed nib portions 11, with a shank portion 12 at right angles to the axis of the nib portion. The shank portion is provided with projections 13 which are subsequently bent to form clamps 14 for engagement with a supporting arm. In referring to a "pointed nib portion," this term is purely relative since, as a matter of fact, the ends of the nib portion have some width and may be slightly wider than the actual gauge of the metal, or wider, as will be pointed out more particularly hereinafter.

The blank shown in Fig. 1 is bent by suitable tools common in the art and under the necessary pressure to produce a pen of the character illustrated in Figs. 2, 3 and 4, wherein it will be noted that the body of the pen which is arcuate in contour and the relatively pointed nib portions define a space 15 in which a supply of marking fluid may be placed and, by reason of the small dimensions of the structure, will be held by capillary attraction.

As illustrated in Fig. 2, the pen occupies one position it may assume when in use; the actuating arm carrying the same being indicated at 21 and held to the pen shank by the clamps 14. In such position the pen is arranged to mark a surface—which may be any form of record sheet—moving horizontally or substantially so beneath the same, and it is essential that the instant the nib end of the pen contacts such surface, marking will commence.

In pens of this type as heretofore made, the ends of the nib portions will lie at right angles to the surface of such nib portions. By reason of the fact that these nib portions are diagonally disposed with respect to a line perpendicular to the normal, the inner edges of such nib portions are spaced away from the record surface and retain the ink in such spaced relation. Such condition, in the use of such pen by reason of the thickness of the metal, renders it difficult of making contact with the surface to be marked until the ends of the nib portions of such character have been wetted sufficiently to cause the marking fluid to flow from the supply within the pen. Attempts have been made to overcome this difficulty by merely flattening the ends of the nib portions, but in the use of pens so shaped there is a decided tendency for the pen to effect a marking much broader than desired and frequently covering or obscuring data printed on the record surface. It may here be noted that the desirable line is preferably one whose width ranges between .006″ and .008″.

In carrying out my invention I provide a contact end for the nib portion of the pen capable of effecting the fine line marking desired with the pen moving in any direction. To this end my improved recording meter pen has the ends of its nibs tapered and rounded as at $a$ to bring the relatively contacting portions of the nib ends exactly at the centre of the same. This tapering and rounding may be effected by a suitable die operation or by a suitable grinding operation.

While pens of this type are usually made from nickel silver having a gauge of substantially .009″ to .014, it will be understood that any form of metal commonly employed in the manufacture of pens—particularly pens of the recording meter type—may be employed. The spacing between the pointed and/or rounded and tapered nib portions of the finished pen at the marking end engaging the record sheet is substantially .001″ which, as above noted, is infinitesimal.

The marking end of my improved recording meter pen is illustrated in the inverted plan view, Fig. 4, where the nib ends are shown as rounded and tapered on both surfaces—edges and faces of the nibs. With such nib portions set in position with an infinitesimal central spacing, not only is there a proper engaging end for contact with the record surface to be marked, but lines of proper and desired width may be effected by such form of pen when moved in any direction under the control of the marking arm. The central contacting end is indicated at $z$. It will be noted that with the construction of pen as illustrated, the marking fluid will reach to the extreme end of the pen and will instantly mark the moment the pen touches the record surface.

While I have described with some particularity features of my invention and have illustrated the desired type of structure it will be understood that the representation is for illustrative purposes only and not as limitations since modifications may be made therein within the spirit of the same; all of which is deemed to be within the scope of the appended claims.

I claim:

1. A fountain pen for use with recording meters having nib portions substantially triangular in form extending from a looped body portion which, with said nib portions, serves as an ink container; said nib portions substantially meeting at their relatively pointed ends and each end having a semi-rounded surface contour extending in all directions away from the ink-delivering space between the same whereby lines of the same weight may be applied by the pen when moved in any direction.

2. A fountain pen as set forth in claim 1 wherein the contacting end of each nib portion is semi-rounded and such nib portions are tapered in all directions away from their semi-rounded ends.

3. A fountain pen of the class described having nib ends of semi-rounded contour whereby the ink-carrying space between the same may be presented directly to the surface to be marked.

4. A fountain pen as set forth in claim 3 wherein the nibs are tapered to the semi-rounded contour at their ends.

5. A pen for use with recording meters having a looped body portion, and relatively pointed nib portions extending from said looped body portion and providing a tapered space between the same which serves as an ink container; each of said nib portions having a semi-rounded end at the point of engagement and in such relation that lines of the same weight may be applied by the pen when moved in any direction with respect to a record sheet.

6. A pen as set forth in claim 5 having a supporting arm integral with said looped body portion and extending laterally therefrom.

7. A pen as set forth in claim 5 having a supporting arm integral with said looped body portion and extending laterally therefrom, and clamping means carried by said supporting arm.

8. A pen for use with recording meters having a supporting arm, a body portion integral with said supporting arm and having a substantially semicircular contour at its junction with the supporting arm, and tapering nib portions extending from said body portion into meeting relation; said nib portions having semi-rounded contours at their meeting ends; of such character and in such relation that lines of the same width may be applied by the pen when moved in any direction with respect to the surface of a record sheet.

9. A pen for use with recording meters comprising a one-piece structure of metal having a supporting arm, a body portion of arcuate contour integral with said arm, and a pair of substantially wedge-shaped nib portions integral with said body and set to provide a substantially wedge-shaped ink-receiving space; said nib portions having semi-rounded extremities in relative engagement to provide a central ink-distributing or marking end whereby lines of the same weight may be applied by the pen when moved in any direction with respect to the surface of a record sheet.

10. A pen for use with recording meters comprising a structure providing a supporting arm, a body portion of arcuate contour connected to said arm, and substantially wedge-shaped nib portions extending from said body and set to provide a substantially wedge-shaped ink-receiving space; said nip portions having semi-rounded extremities in relative engagement and shaped to provide a marking end whereby lines of the same weight may be applied by the pen when moved in any direction with respect to the surface of a moving record sheet.

11. A fountain pen for use with recording meters and arranged to mark upon a moving record sheet comprising a body portion, spaced nib portions substantially triangular in form connected to and extending from said body portion which, with said nib portions, serves as an ink container; said nib portions substantially meeting at their relatively pointed ends and the pen tip thus formed having a tapered and rounded surface contour extending in all directions away from the ink-delivering point of the same whereby lines of the same weight may be applied by the pen when moved in any direction.

12. A pen for use with recording meters comprising a body portion, and relatively pointed nib portions in spaced relation with respect to the body portion and extending away from the same to provide a space therebetween serving as an ink container; said nib portions being tapered and having semi-rounded tapered ends at their point of engagement and being disposed in such relation that lines of the same weight may be applied by the pen when moved in any direction with respect to the surface of a record sheet.

WALTER V. COOK.

REFERENCES CITED

The following references are of record in the file of this patent:

UNITED STATES PATENTS

| Number | Name | Date |
| --- | --- | --- |
| 1,154,498 | Ferris | Sept. 21, 1915 |
| 2,105,049 | Lungren | Jan. 11, 1938 |
| 1,715,117 | Chrisman | May 28, 1929 |
| 2,063,458 | Nome | Dec. 8, 1936 |
| 1,917,572 | Binckley | July 11, 1933 |
| 941,403 | Betzler | Nov. 30, 1909 |
| 2,030,918 | Halpin et al. | Feb. 18, 1936 |
| 2,067,040 | Barton, Jr. | Jan. 5, 1937 |
| 2,208,477 | Shea | July 16, 1940 |